US007745790B2

(12) United States Patent
Chowdhury et al.

(10) Patent No.: US 7,745,790 B2
(45) Date of Patent: Jun. 29, 2010

(54) NEGATIVE REFRACTIVE INDEX DEVICE FOR GENERATING TERAHERTZ OR MICROWAVE RADIATION AND METHOD OF OPERATION THEREOF

(75) Inventors: Aref Chowdhury, Berkeley Heights, NJ (US); John A. Tataronis, Santa Fe, NM (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 20 days.

(21) Appl. No.: 11/942,776

(22) Filed: Nov. 20, 2007

(65) Prior Publication Data

US 2009/0127472 A1 May 21, 2009

(51) Int. Cl.
*G01J 1/42* (2006.01)

(52) U.S. Cl. .................................................. 250/341.1

(58) Field of Classification Search ............. 250/341.1, 250/504 R, 493.1, 394
See application file for complete search history.

(56) References Cited

U.S. PATENT DOCUMENTS 5,543,960 A 8/1996 Carrig et al.
5,861,970 A * 1/1999 Tatham et al. ............... 398/150
6,144,679 A 11/2000 Herman et al.
6,201,638 B1 * 3/2001 Hall et al. .................. 359/346
6,697,186 B2 2/2004 Kawase et al.
7,009,575 B2 * 3/2006 Holly et al. ................. 343/820
7,102,751 B2 * 9/2006 Harper ....................... 356/437
7,158,545 B2 * 1/2007 Hu et al. ....................... 372/4
2005/0206997 A1 * 9/2005 Hubbard ..................... 359/330
2006/0045541 A1 * 3/2006 Chowdhury et al. ........ 398/188
2006/0109540 A1 * 5/2006 Kueks et al. ................ 359/321
2006/0243925 A1 * 11/2006 Barker et al. ............ 250/504 R
2007/0138402 A1 * 6/2007 Hyde et al. ................. 250/394
2007/0232738 A1 * 10/2007 Bratkovski et al. .......... 524/439
2008/0165079 A1 * 7/2008 Smith et al. ............. 343/911 R
2008/0219628 A1 * 9/2008 Podolskiy et al. ........... 385/123

OTHER PUBLICATIONS

Popov et al.; Negative-index metamaterials: Second-harmonic generation, Manley-Rowe relations and parametric amplification; Appl. Phys. B 84, 131-137 (2006).*
D.R. Smith, et al., "Metamaterials and Negative Refractive Index" Science, vol. 305, Aug. 6, 2004, pp. 788-792.
Costas M. Soukoulis, et al., "Negative Refractive Index at Optical Wavelengths" Science, vol. 315, Jan. 5, 2007, pp. 47-49.

* cited by examiner

*Primary Examiner*—David P Porta
*Assistant Examiner*—Djura Malevic
(74) *Attorney, Agent, or Firm*—Hitt Gaines, PC

(57) ABSTRACT

A negative refractive index device and a method of generating radiation. In one embodiment, the device includes: (1) an optical input configured to receive light and (2) an optical medium having a negative index of refraction and a second-order nonlinearity proximate a center frequency of the light, coupled to the optical input and configured to resonate in response to the light to yield radiation having a phase velocity based on a group velocity of the light.

17 Claims, 3 Drawing Sheets

NEGATIVE REFRACTIVE INDEX DEVICE FOR GENERATING TERAHERTZ OR MICROWAVE RADIATION AND METHOD OF OPERATION THEREOF

TECHNICAL FIELD OF THE INVENTION

The invention is directed, in general, to and, more specifically, to a negative refractive index device for generating terahertz or microwave radiation and a method of generating such radiation.

BACKGROUND OF THE INVENTION

Terahertz radiation, sometimes called "T-rays," remains a relatively unexplored region of the electromagnetic spectrum. Terahertz radiation lies in the frequency band between about $10^{11}$ Hertz (Hz) and about $5\times10^{13}$ Hz and therefore between microwaves and infrared light. Terahertz radiation is important, because it has potential use in many military, security, commercial, biomedical, pharmaceutical and scientific research applications. Terahertz radiation can penetrate most solid substance and so behave like X-rays. Unlike X-rays however, terahertz radiation is non-ionizing and thus substantially safer to use. Terahertz radiation also can produce images of higher resolution than X-rays. Because of terahertz radiation's ability to penetrate fabrics and plastics, it can be used in surveillance, including security screening, to uncover concealed weapons on a person. This is highly useful, because many materials of interest, such as plastic explosives, exhibit unique spectral "fingerprints" in the terahertz range. This offers the possibility of combining spectral identification with imaging. Terahertz radiation can also be used to characterize semiconductors more accurately and widen wireless communication frequency bands.

Because they can penetrate several centimeters into human flesh, terahertz radiation can detect tumors far better than today's mammograms and can detect skin cancer before it appears as lesions on the skin. Coupled with tomography algorithms, terahertz radiation can be used to create a 3-D map of the human body that has a far higher resolution than one produced by nuclear magnetic resonance (NMR), paving the way for a host of diseases to be detected earlier and more effectively.

A heavy demand for terahertz radiation also exists in the communications industry. For example, a terahertz-frequency heterodyne receiver can dramatically increase the available bandwidth in wavelength-division-multiplexed (WDM) communication systems.

However, while the benefits of having terahertz radiation have been understood for over a decade, having a powerful source of terahertz radiation has eluded technologists so far. Currently, two basic techniques for generating terahertz radiation are used: photoconduction and nonlinear optical frequency conversion. Electrically biased high-speed photoconductors may be used as transient current sources for radiating antennas, including dipoles, resonant dipoles, transmission lines, tapered antennas and large-aperture photoconducting antennas. U.S. Pat. Nos. 6,144,679, 6,697,186 and 5,543,960 teach various ways in which second- or higher-order nonlinear optical effects in unbiased materials may be employed to generate terahertz radiation.

No matter which technique is chosen, the terahertz power generated is usually on the order of microwatts, even with many watts of input power. The inability to generate significant terahertz power places most real-world applications out of reach. In addition, substantial cooling is required with both photoconduction and nonlinear optical frequency conversion due to their low efficiency.

Given the above, what is needed in the art is a better technique for generating terahertz radiation. Further, because microwave radiation also finds great use in a host of applications, what is needed in the art is a better technique for generating microwave radiation. More particularly, what is needed in the art is a better technique for generating significant terahertz or microwave power.

SUMMARY OF THE INVENTION

To address the above-discussed deficiencies of the prior art, one aspect of the invention provides a negative refractive index device. In one embodiment, the negative refractive index device includes: (1) an optical input configured to receive light and (2) an optical medium having a negative index of refraction and a second-order nonlinearity proximate (near or at) a center frequency of the light, coupled to the optical input and configured to resonate in response to the light to yield radiation having a phase velocity based on a group velocity of the light.

In another aspect, the invention provides a method of generating radiation. In one embodiment, the method includes: (1) receiving light into an optical input and (2) receiving the light into an optical medium having a negative index of refraction and a second-order nonlinearity proximate a center frequency of the light, the optical medium resonating in response thereto to yield the radiation, the radiation having a phase velocity based on a group velocity of the light.

In another aspect, the invention provides a negative refractive index device. In one embodiment, the negative refractive index device includes: (1) a light pump coupled to the optical input and configured to generate light, (2) an optical input coupled to the light pump and configured to receive the light and (3) an optical medium having a negative index of refraction and a second-order nonlinearity proximate a center frequency of the light, coupled to the optical input and configured to resonate in response to the light to yield radiation having a phase velocity based on a group velocity of the light.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Figure 1:
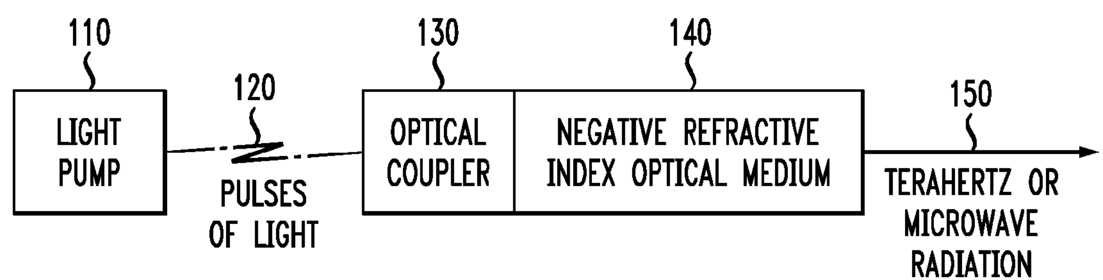
FIG. 1 illustrates a high-level block diagram of one embodiment of a negative refractive index device for generating terahertz or microwave radiation constructed according to the principles of the invention.

FIG. 1 illustrates a high-level block diagram of one embodiment of a negative refractive index device for generating terahertz or microwave radiation constructed according to the principles of the invention.

In the illustrated embodiment, the negative refractive index device receives pulses of light from a light pulse source, which may be a light pump 110. The pulses of light lie about a center frequency $f_c$ and have a certain bandwidth $f_h$-$f_l$. The center frequency of the pulses of light may be between about $10^{13}$ Hz and about $10^{15}$ Hz. In the illustrated embodiment, the center frequency of the pulses of light is between about $1.5\times10^{14}$ Hz and about $6\times10^{14}$ Hz. The pulses of light may have a bandwidth between about $3\times10^{8}$ Hz and about $5\times10^{13}$ Hz. In the illustrated embodiment, the pulses of light have a bandwidth between about $5\times10^{8}$ Hz and about $5\times10^{12}$ Hz.

In an alternative embodiment, the negative refractive index device receives continuous-wave light. In other embodiments, the negative refractive index device receives combinations of pulses of light and continuous-wave light.

Returning to the embodiment of FIG. 1, the light pump 110 causes the pulses of light to be transmitted along an optical fiber 120 to the device. In an alternative embodiment, the light pump 110 may transmit the pulses of light through free space to the device. The device includes an optical coupler 130 that, in the embodiment of FIG. 1, is coupled to the optical fiber 120. The optical coupler 130 provides a transition region for the pulses of light as they travel from the optical fiber 120 (or free space) to a negative refractive index optical medium 140. In the embodiment of FIG. 1, the negative refractive index optical medium 140 is a metamaterial. In an alternative embodiment, the negative refractive index optical medium 140 is a homogeneous material. The term "optical medium" as used herein therefore encompasses both metamaterials and homogeneous materials.

The optical medium 140 constitutes the heart of the device of FIG. 1. The optical medium 140 has a negative index of refraction (n) proximate a center frequency of the pulses of light. One way to realize a negative index of refraction is if the medium has both a negative electrical permittivity ($\in$) and a negative magnetic permeability ($\mu$) proximate a center frequency of the pulses of light. The optical medium 140 also exhibits a second-order nonlinearity proximate the center frequency of the pulse of light and the output radiation of interest.

The pulses of light enter and propagate through the optical medium 140 at a certain group velocity ($d\omega/dk$) that depends upon n. A resonance begins to occur in the optical medium 140 that amounts to a special case of three-wave mixing, a phenomenon that is known to occur in other contexts to those skilled in the pertinent art. As a result, radiation having a phase velocity ($\omega/k$) based on, or even a function of, the group velocity of the pulses of light is generated and begins to exit the optical medium 140 as an arrow 150 indicates. The radiation may be terahertz radiation of between about $3\times10^{11}$ Hz and about $5\times10^{13}$ Hz or microwave radiation of between about $3\times10^{8}$ Hz and about $3\times^{11}$ Hz. In the illustrated embodiment, the radiation is terahertz radiation of between about $5\times10^{11}$ Hz and about $5\times10^{12}$ Hz or microwave radiation of between about $1\times10^{9}$ Hz and about $1\times10^{11}$ Hz.

Figure 2:
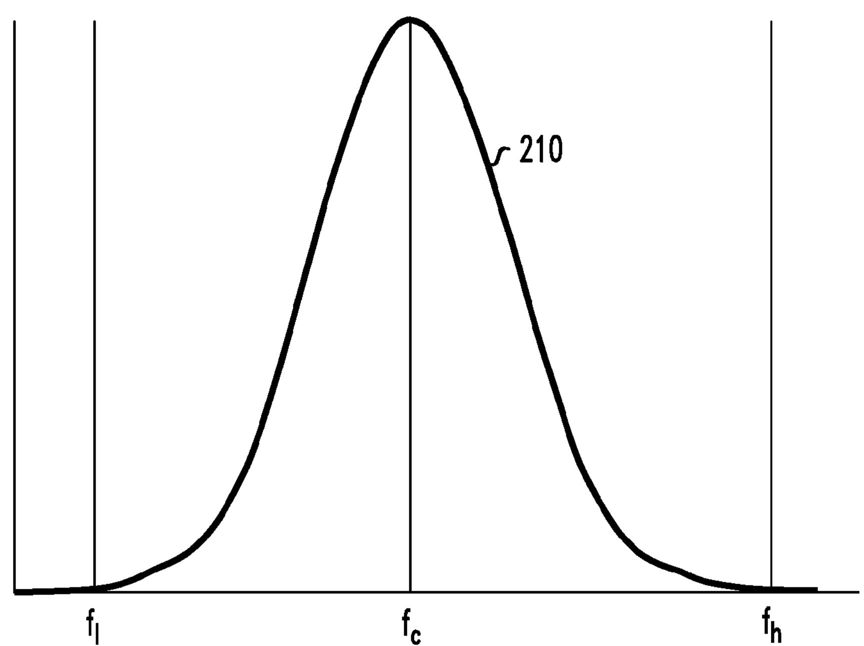
FIG. 2 illustrates a pulse of light that may be provided to the negative refractive index device of FIG. 1.

To understand the resonance that occurs within the optical medium 140, it is important to understand the structure of a representative pulse of light and the optical properties of the optical medium. Accordingly, FIG. 2 illustrates a pulse of light 210 that may be provided to the metamaterial-based device of FIG. 1. FIG. 2 plots amplitude as a function of frequency.

The pulse of light 210 has center frequency $f_c$. On either side of $f_c$ lie a lower frequency $f_l$ and an upper frequency $f_h$. The properties of the optical medium 140 of FIG. 1 are selected such that light of various frequencies between the lower and higher frequencies $f_l$, $f_h$ causes a resonance in the optical medium. Before discussing those properties, it should be noted that while the pulse of light 210 is illustrated as being generally Gaussian in shape, other shapes fall within the scope of the invention. In fact, particular embodiments of the invention may employ a chirped pulse of light such that the lower and upper frequencies $f_l$, $f_h$ are amplified with respect to the remainder of the pulse of light.

The optical medium provides the medium within which three-wave mixing occurs with respect to the lower and upper frequencies $f_l$, $f_h$ to generate the output (terahertz or microwave) radiation. Therefore, the optical medium should have certain physical properties, namely a negative n proximate the center frequency of the pulses of light and a second-order nonlinearity; the optical medium should not rely on an adjacent structure, such as a nonlinear positive dielectric, for its second-order nonlinearity. The second order nonlinearity may be inherent to the optical medium, or a second-order nonlinear positive dielectric may be embedded in the negative index medium to provide the nonlinearity.

The optical medium may thus be modeled as a Lorentz oscillator with second-order nonlinear susceptibility. For the inherent second-order nonlinearity, a lossless Lorentz anharmonic oscillator model may best characterize the effective nonlinear susceptibilities of the optical medium. That model and its nonlinear susceptibilities are described in Chowdhury, et al., "Nonlinear Wave Mixing and Susceptibility Properties of Negative Refractive Index Materials," Phys. Rev. E, vol. 75, 016603 (2007), incorporated herein by reference.

To satisfy a long wave short wave (LWSW) resonance condition, the group velocity of the short wave (high frequency wave) should be equal to the phase velocity of the long wave (low frequency wave). A technique to determine the frequencies that satisfy this condition will now be set forth.

The wave vector of a particular wave is given by:

$$k(\omega) = \frac{\omega}{c_0}\sqrt{\varepsilon(\omega)\mu(\omega)}$$

Differentiating with respect to ω, $$\frac{dk}{d\omega} = \frac{1}{c_0}\left[\omega\frac{d(\varepsilon\mu)^{\frac{1}{2}}}{d\omega} + (\varepsilon\mu)^{\frac{1}{2}}\right]$$

$$\Rightarrow \frac{dk}{d\omega} = \frac{1}{c_0}\left\{\omega\left[\frac{1}{2}(\varepsilon\mu)^{-\frac{1}{2}}\left(\varepsilon\frac{d\mu}{d\omega} + \mu\frac{d\varepsilon}{d\omega}\right)\right] + (\varepsilon\mu)^{\frac{1}{2}}\right\}$$

$$\Rightarrow \frac{dk}{d\omega} = \frac{1}{c_0}\left[\frac{\omega}{2(\varepsilon\mu)^{\frac{1}{2}}}\left(\varepsilon\frac{d\mu}{d\omega} + \mu\frac{d\varepsilon}{d\omega}\right) + (\varepsilon\mu)^{\frac{1}{2}}\right]$$

$$\Rightarrow \frac{dk}{d\omega} = \left\{\frac{\omega}{2c_0}\left[\left(\frac{\varepsilon}{\mu}\right)^{\frac{1}{2}}\frac{d\mu}{d\omega} + \left(\frac{\mu}{\varepsilon}\right)^{\frac{1}{2}}\frac{d\varepsilon}{d\omega}\right] + \frac{(\varepsilon\mu)^{\frac{1}{2}}}{c_0}\right\}.$$

Figure 3:
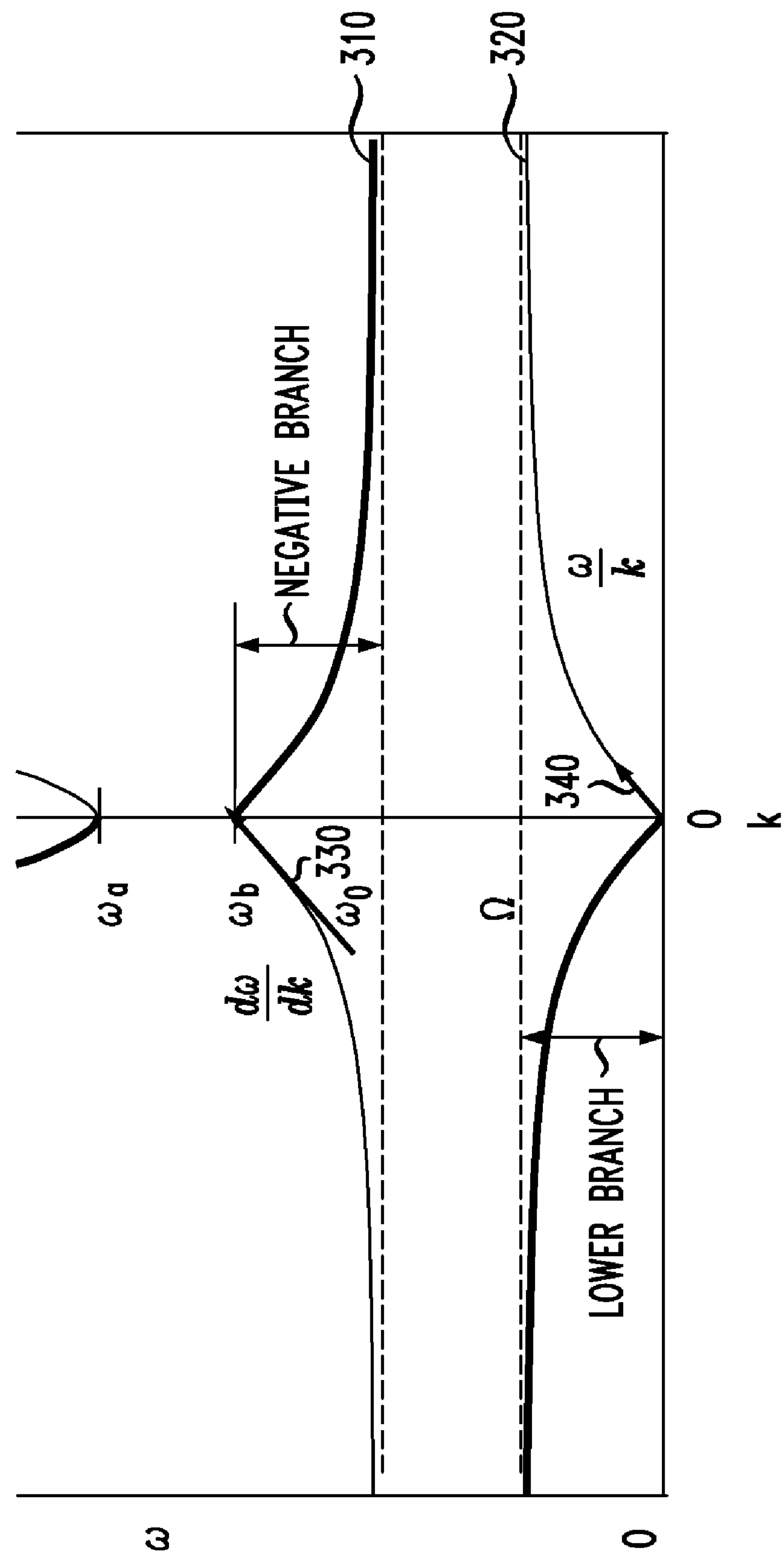
FIG. 3 illustrates a dispersion diagram of the negative refractive index device of FIG. 1.

For LWSW resonance, $$\frac{d\omega_s}{dk} = \frac{\omega_l}{k_l},$$

where the subscript "s" refers to the short wave (which lies on the negative branch in the negative index media case, illustrated in FIG. 3) and the subscript "1" refers to the long wave (which lies on the lower positive branch in the negative index media case, also illustrated in FIG. 3). It should be noted that the term $$(\varepsilon\mu)^{\frac{1}{2}}$$

is equal to $$-\left(\left|(\varepsilon\mu)^{\frac{1}{2}}\right|\right)$$

when the frequency at which ∈ and μ are evaluated has a negative index of refraction.

$$\Rightarrow \frac{dk_s}{d\omega} = \frac{k_l}{\omega_l}$$

$$\Rightarrow \frac{\omega_s}{2c_0}\left[\left(\frac{\varepsilon_s}{\mu_s}\right)^{\frac{1}{2}}\frac{d\mu_s}{d\omega} + \left(\frac{\mu_s}{\varepsilon_s}\right)^{\frac{1}{2}}\frac{d\varepsilon_s}{d\omega}\right] - \frac{\left(\left|(\varepsilon_s\mu_s)^{\frac{1}{2}}\right|\right)}{c_0} = \frac{k_l}{\omega_l}$$

$$\text{But } \frac{k_l}{\omega_l} = \frac{(\varepsilon_l\mu_l)^{\frac{1}{2}}}{c_0}$$

$$\Rightarrow \frac{\omega_s}{2c_0}\left[\left(\frac{\varepsilon_s}{\mu_s}\right)^{\frac{1}{2}}\frac{d\mu_s}{d\omega} + \left(\frac{\mu_s}{\varepsilon_s}\right)^{\frac{1}{2}}\frac{d\varepsilon_s}{d\omega}\right] - \frac{\left(\left|(\varepsilon_s\mu_s)^{\frac{1}{2}}\right|\right)}{c_0} = \frac{(\varepsilon_l\mu_l)^{\frac{1}{2}}}{c_0}$$

$$\Rightarrow \frac{\omega_s}{2}\left[\left(\frac{\varepsilon_s}{\mu_s}\right)^{\frac{1}{2}}\frac{d\mu_s}{d\omega} + \left(\frac{\mu_s}{\varepsilon_s}\right)^{\frac{1}{2}}\frac{d\varepsilon_s}{d\omega}\right] - \left(\left|(\varepsilon_s\mu_s)^{\frac{1}{2}}\right|\right) = (\varepsilon_l\mu_l)^{\frac{1}{2}}.$$

The above expression is the LWSW resonance condition in terms of the permittivity ∈ and permeability μ of the medium.

To exemplify the technique for determining the frequencies that satisfy the LWSW resonance condition further, it will be assumed that for an actual or effective medium, permittivity ∈ may be expressed as $$\varepsilon(\omega) = \varepsilon_0\frac{\omega^2 - \omega_a^2}{\omega^2 - \omega_0^2},$$

and permeability μ may be expressed as $$\mu(\omega) = \mu_0\frac{\omega^2 - \omega_b^2}{\omega^2 - \Omega^2}.$$

Differentiating the permittivity with respect to ω, $$\frac{d\varepsilon}{d\omega} = \varepsilon_0\left[(\omega^2 - \omega_a^2)(-1)(\omega^2 - \omega_0^2)^{-2}(2\omega) + (\omega^2 - \omega_0^2)^{-1}(2\omega)\right].$$

$$\Rightarrow \frac{d\varepsilon}{d\omega} = \varepsilon_0\left[\frac{-2\omega(\omega^2 - \omega_a^2)}{(\omega^2 - \omega_0^2)^2} + \frac{2\omega}{(\omega^2 - \omega_0^2)}\right]$$

$$\Rightarrow \frac{d\varepsilon}{d\omega} = 2\varepsilon_0\omega\left[\frac{1}{(\omega^2 - \omega_0^2)} - \frac{(\omega^2 - \omega_a^2)}{(\omega^2 - \omega_0^2)^2}\right]$$

$$\Rightarrow \frac{d\varepsilon}{d\omega} = 2\varepsilon_0\omega\frac{(\omega_a^2 - \omega_0^2)}{(\omega^2 - \omega_0^2)^2}.$$

Similarly, the derivative of the permeability is given by:

$$\frac{d\mu}{d\omega} = 2\mu_0\omega\frac{(\omega_b^2 - \Omega^2)}{(\omega^2 - \Omega^2)^2}.$$

The LWSW resonance condition can now be written as:

$$\left[\varepsilon_0\mu_0\frac{(\omega_s^2 - \omega_a^2)(\omega_s^2 - \Omega^2)}{(\omega_s^2 - \omega_0^2)(\omega_s^2 - \omega_b^2)}\right]^{\frac{1}{2}}\omega_s^2\frac{(\omega_b^2 - \Omega^2)}{(\omega_s^2 - \Omega^2)^2} + \left[\varepsilon_0\mu_0\frac{(\omega_s^2 - \omega_0^2)(\omega_s^2 - \omega_b^2)}{(\omega_s^2 - \omega_a^2)(\omega_s^2 - \Omega^2)}\right]^{\frac{1}{2}}\omega_s^2\frac{(\omega_a^2 - \omega_0^2)}{(\omega_s^2 - \omega_0^2)^2} = \left[\varepsilon_0\mu_0\frac{(\omega_l^2 - \omega_a^2)(\omega_l^2 - \omega_b^2)}{(\omega_l^2 - \omega_0^2)(\omega_l^2 - \Omega^2)}\right]^{\frac{1}{2}} + \left|\left[\varepsilon_0\mu_0\frac{(\omega_s^2 - \omega_a^2)(\omega_s^2 - \omega_b^2)}{(\omega_s^2 - \omega_0^2)(\omega_s^2 - \Omega^2)}\right]^{\frac{1}{2}}\right|$$

Given the parameters $\omega_o$, $\omega_a$, $\omega_b$ and Ω, the pair(s) of frequencies ($\omega_s$, $\omega_1$) that satisfy the above condition can be found numerically.

Those skilled in the art, given the above disclosure, will understand that a variety of optical medium structures can provide the physical properties described above. The invention is not limited to a particular structure and, indeed, encompasses various metamaterials and other optical media.

FIG. 3 illustrates a dispersion diagram of the optical medium 140 in the device of FIG. 1. Assuming the optical medium exhibits a permittivity ∈ given by:

$$\varepsilon(\omega) = \varepsilon_0\frac{\omega^2 - \omega_a^2}{\omega^2 - \omega_0^2}$$

and a permeability p given by:

$$\mu(\omega) = \mu_0\frac{\omega^2 - \omega_b^2}{\omega^2 - \Omega^2},$$

where $\omega_a$ and $\omega_b$ are cutoff frequencies and $\omega_o$ and Ω are resonant frequencies, the dispersion relation is given by:

$$k(\omega) = \pm \frac{\omega}{c} \sqrt{\frac{(\omega^2 - \omega_a^2)\,(\omega^2 - \omega_b^2)}{(\omega^2 - \omega_a^2)\,(\omega^2 - \Omega^2)}}.$$

Two curves 310, 320 illustrate this dispersion relation. The curve 310 pertains to the pulses of light and has a negative branch so labeled. A group velocity (dω/dk) vector 330 lies along the curve 310 and applies to the pulses of light. The curve 320 pertains to the radiation and has a lower branch so labeled. A phase velocity (ω/k) vector 340 bridges two points on the curve 320 and applies to the radiation that results from the three-wave mixing. The group velocity (dω/dk) vector 330 and the phase velocity (ω/k) vector 340 are parallel one another, which is a condition necessary for setting up the long wave short wave resonance that occurs in the optical medium.

Figure 4:
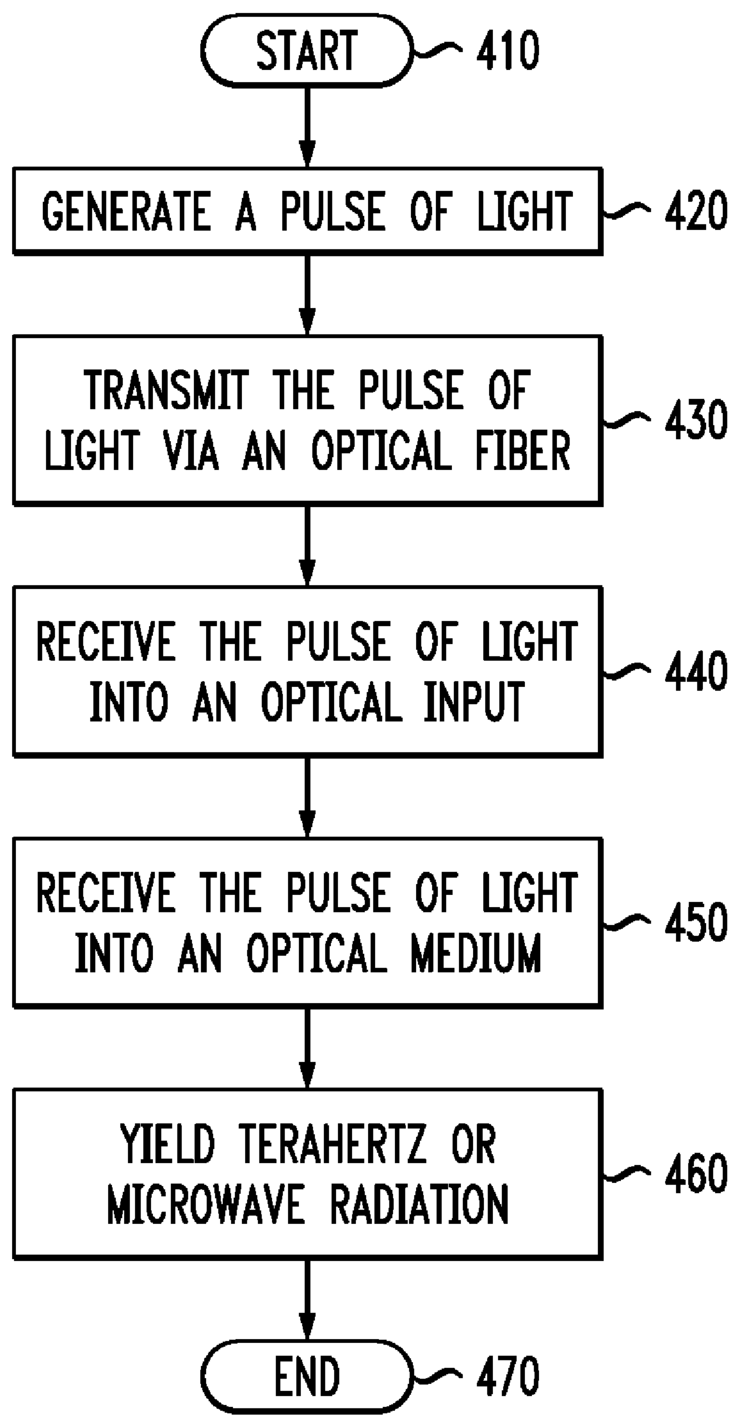
FIG. 4 illustrates a flow diagram of one embodiment of a method of generating terahertz or microwave radiation carried out according to the principles of the invention.

FIG. 4 illustrates a flow diagram of one embodiment of a method of generating terahertz or microwave radiation carried out according to the principles of the invention. The method begins in a start step 410. In a step 420, a pulse of light is generated, perhaps with a light pump coupled to the optical input. In a step 430, the pulse of light is transmitted to an optical input, perhaps via an optical fiber. In a step 440, the pulse of light is received into the optical input. In a step 450, the pulse of light is received into an optical medium. As stated above, the optical medium has a negative index of refraction and a second-order nonlinearity proximate a center frequency of the pulse of light. In a step 460, the optical medium resonates in response thereto to yield radiation having a phase velocity based on a group velocity of the pulse of light. As the step 460 indicates, the radiation may be terahertz or microwave radiation. The method ends in an end step 470.

Those skilled in the art to which the invention relates will appreciate that other and further additions, deletions, substitutions and modifications may be made to the described embodiments without departing from the scope of the invention.

What is claimed is:

1. A negative refractive index device, comprising:

an optical input configured to receive light; and an optical medium having a negative index of refraction and a second-order nonlinearity proximate a center frequency of said light, coupled to said optical input and configured to resonate in response to said light to yield radiation of between about 0.3 to 50 terahertz having a phase velocity that varies with a group velocity of said light.

2. The device as recited in claim 1 further comprising an optical fiber coupled to said optical input.

3. The device as recited in claim 1 wherein said center frequency is between about $10^{13}$ Hz and about $10^{15}$ Hz.

4. The device as recited in claim 1 wherein said light has a bandwidth between about $3\times10^{8}$ Hz and about $5\times10^{13}$ Hz.

5. The device as recited in claim 1 further comprising a light pump coupled to said optical input and configured to generate pulses of said light.

6. A method of generating radiation, comprising:

receiving light into an optical input; and receiving said light into an optical medium having a negative index of refraction and a second-order nonlinearity proximate a center frequency of said light, said optical medium resonating in response thereto to yield said radiation of between about 0.3 to about 50 terahertz, said radiation having a phase velocity that varies with a group velocity of said light.

7. The method as recited in claim 6 further comprising transmitting said light to said optical input via an optical fiber.

8. The method as recited in claim 6 wherein said center frequency is between about $10^{13}$ Hz and about $10^{15}$ Hz.

9. The method as recited in claim 6 wherein said light has a bandwidth between about $3\times10^{8}$ Hz and about $5\times10^{13}$ Hz.

10. The method as recited in claim 6 further comprising generating said light with a light pump coupled to said optical input and configured to generate pulses of said light.

11. A negative refractive index device, comprising:

a light pump coupled to an optical input and configured to generate pulses of light;

said optical input coupled to said light pump and configured to receive said pulses of light; and a metamaterial having a negative index of refraction and a second-order nonlinearity proximate a center frequency of said light, coupled to said optical input and configured to resonate in response to said pulses of light to yield radiation of between about 0.3 to 50 terahertz having a phase velocity that varies with a group velocity of said pulses of light.

12. The device as recited in claim 11 further comprising an optical fiber coupled between said light pump and said optical input.

13. The device as recited in claim 11 wherein said center frequency is between about $10^{13}$ Hz and about $10^{15}$ Hz.

14. The device as recited in claim 13 wherein said center frequency is between about $1.5\times10^{14}$ Hz and about $6\times10^{14}$ Hz.

15. The device as recited in claim 11 wherein said light has a bandwidth between about $3\times10^{8}$ Hz and about $5\times10^{13}$ Hz.

16. The device as recited in claim 15 wherein said light has a bandwidth between about $5\times10^{8}$ Hz and about $5\times10^{12}$ Hz.

17. The device as recited in claim 11 wherein said radiation is selected from the group consisting of:

terahertz radiation of between about $5\times10^{11}$ Hz and about $5\times10^{12}$ Hz.

* * * * *